(12) United States Patent
Murphy (10) Patent No.: US 9,022,040 B2
(45) Date of Patent: May 5, 2015

(54) METHODS FOR EXTRACTING AND ISOLATING CONSTITUENTS OF CELLULOSIC MATERIAL

(75) Inventor: James Murphy, London (GB)

(73) Assignee: British American Tobacco (Investments) Limited, London (GB)

( * ) Notice: Subject to any disclaimer, the term of this patent is extended or adjusted under 35 U.S.C. 154(b) by 0 days.

(21) Appl. No.: 13/583,573

(22) PCT Filed: Mar. 8, 2011

(86) PCT No.: PCT/GB2011/050455
§ 371 (c)(1),
(2), (4) Date: Dec. 26, 2012

(87) PCT Pub. No.: WO2011/110843
PCT Pub. Date: Sep. 15, 2011

(65) Prior Publication Data
US 2013/0160777 A1    Jun. 27, 2013

(30) Foreign Application Priority Data
Mar. 9, 2010    (GB) .................................. 1003887.5

(51) Int. Cl.
*A24B 15/24*    (2006.01)
*A23L 1/221*    (2006.01)
*B01D 11/02*    (2006.01)

(52) U.S. Cl.
CPC ............... *A24B 15/24* (2013.01); *A24B 15/241* (2013.01); *A24B 15/245* (2013.01); *A23L 1/2215* (2013.01); *A23L 1/2217* (2013.01); *B01D 11/0203* (2013.01)

(58) Field of Classification Search
CPC .................................................. B01D 11/0203
See application file for complete search history.

(56) References Cited

U.S. PATENT DOCUMENTS

| | | | |
|---|---|---|---|
| 4,506,682 A | 3/1985 | Muller | |
| 5,017,397 A * | 5/1991 | Nguyen et al. | 426/542 |
| 5,120,558 A * | 6/1992 | Nguyen et al. | 426/425 |
| 5,252,729 A | 10/1993 | De Crosta et al. | |
| 5,497,792 A | 3/1996 | Prasad et al. | |
| 6,637,438 B1 | 10/2003 | Lane | |
| 2006/0065279 A1 | 3/2006 | Yamada et al. | |

FOREIGN PATENT DOCUMENTS

| | | |
|---|---|---|
| CN | 1302568 A | 7/2001 |
| CN | 1459256 A | 12/2003 |

(Continued)

OTHER PUBLICATIONS

Ivanovic, Jasna, et al. Supercritical CO2 extraction of *Helichrysim italicum*: Influence of CO2 density and moisture content of plant material, 2011, Elsevier, J. of Supercritical Fluids, vol. 57, 129-136.*

(Continued)

*Primary Examiner* — Michael J Felton
(74) *Attorney, Agent, or Firm* — NW Poulsen; LA Pinol (57) ABSTRACT

A method for extracting and isolating constituents of cellulosic matter, comprising providing cellulosic matter; contacting the cellulosic matter with a supercritical fluid; separating the supercritical fluid from the cellulosic matter, thereby forming an extract and a raffinate; and separating at least one compound present in the extraction medium by distillation.

33 Claims, 2 Drawing Sheets

(56) References Cited

FOREIGN PATENT DOCUMENTS

| | | |
|---|---|---|
| CN | 1166753 C | 9/2004 |
| CN | 1899142 A | 1/2007 |
| EP | 0280817 A2 | 9/1988 |
| EP | 0338831 A2 | 10/1989 |
| EP | 0440022 A2 | 8/1991 |
| GB | 2014425 A | 8/1979 |
| JP | 3127975 A | 5/1991 |
| JP | 05-236926 A | 9/1993 |
| JP | 06-007605 A | 1/1994 |
| JP | 06-093285 A | 4/1994 |
| JP | 9010502 A | 1/1997 |
| WO | 01/65954 A1 | 9/2001 |
| WO | 2004/098323 A1 | 11/2004 |
| WO | 2007/053096 A1 | 5/2007 |
| WO | 2007/119790 A1 | 10/2007 |

OTHER PUBLICATIONS

International Search Report and Written Opinion, mailed Jun. 21, 2011, for PCT International Application No. PCT/GB2011/050455, filed Mar. 8, 2011.

Written Opinion, mailed Feb. 21, 2012, for PCT International Application No. PCT/GB2011/050455, filed Mar. 8, 2011.

International Preliminary Report on Patentability, mailed May 16, 2012, for PCT International Application No. PCT/GB2011/050455, filed Mar. 8, 2011.

* cited by examiner

METHODS FOR EXTRACTING AND ISOLATING CONSTITUENTS OF CELLULOSIC MATERIAL

CLAIM FOR PRIORITY

This application is a National Stage Entry entitled to and hereby claims priority under 35 U.S.C. §§365 and 371 to corresponding PCT Application No. PCT/GB2011/050455, filed Mar. 8, 2011, which in turn claims priority to British Application Serial No. GB 1003887.5, filed Mar. 9, 2010. The entire contents of the aforementioned applications are herein expressly incorporated by reference.

FIELD OF INVENTION

The present invention relates to a method for extracting and isolating constituents of cellulosic material, and the constituents that are isolated using the method. More specifically, the invention relates to a method comprising supercritical extraction of cellulosic material, such as tobacco, followed by separation of at least one of the constituents present in the extraction medium by distillation.

The constituents of cellulosic material to be extracted and isolated have flavourant and/or aroma properties, in that they impart a flavour or aroma to the cellulosic material from which they are isolated, or to cellulosic material to which they are subsequently added.

The isolated constituents are intended to be used to enhance the flavour and/or aroma properties of products, and in particular, combustible and non-combustible tobacco products, or tobacco- or nicotine-replacement products.

BACKGROUND OF THE INVENTION

Users of combustible and non-combustible tobacco products can be very sensitive to the taste of the product they use. The processes involved in manufacturing such products can result in removal of constituents of the tobacco which contribute to taste and/or aroma. As a result, it can be desirable to enhance the flavour of the tobacco before, during or after processing.

Further to this, it can be desirable to create products which provide the user with a taste or aroma sensation associated with a tobacco product, but which do not themselves contain tobacco, for example, tobacco-free or nicotine-replacement products.

It can also be desirable to create products which provide the user with a particular taste or aroma sensation, for example, a menthol flavour and/or smell.

These objects can be achieved by the use of flavourants and/or aroma agents.

Flavourants are substances which are capable of imparting a sensation in the mouth of the user. The sensation is perceived principally by the senses of taste and smell, but can also be detected by the tactile and heat receptors in the mouth, which detect trigeminal sensations such as astringency, pungency and heat/cooling.

Most substances which produce flavours in the mouth are polar, non-volatile and water soluble. Substances which impart an aroma must be sufficiently volatile to allow detection within the olfactory receptors, either via the nasal or oral passageways. The multitude of flavours that a user is able to detect arise from interactions of chemical compounds with taste, trigeminal and aroma receptors.

Some examples of non-volatile and volatile aroma and flavourant compound classes are provided in Table 1 below, however, it must be appreciated that chemicals of a single class can elicit many diverse flavours, especially at different concentrations.

TABLE 1

| Compound Class | Sensory Character | Example |
| --- | --- | --- |
| Aldehydes | Fruity | Hexanal, pentanal, acetaldehyde, vanillin |
| Alcohols | Sweet | Menthol, maltol, |
| Esters | Bitter | Ethyl acetate, ethyl butyrate |
| Ketones | Caramel | Diacetyl, ionone furanones |
| Phenolics | Medicinal, smokey | Phenol(s), guaiacols |

Agents which have flavourant and/or aroma properties can be derived from various sources. Many of these sources are natural, for example cellulosic materials such as *Mentha arvensis* or *Mentha piperita*, from which a mint flavourant may be isolated, *Zingiber officinale*, from which a ginger flavourant can be isolated, the buds of *Ribes nigrum* (blackcurrant), from which the flavourant solanone can be isolated, *Trigonella foenum-graecum* (fenugreek), from which the flavourant dihydroactinidiolide can be isolated, and *Cichorium intybus*, from which a chicory flavourant can be isolated.

Another source of flavourants is tobacco, which is known to contain flavourants such as pulegone; piperonal; geranylacetone; 3-methylbutanal; benzene ethanol; methyl tetradecanoate; aromatic aldehydes such as benzaldehyde and phenyl acetaldehyde; alkyl aldehydes such as nonanal, pentanal and hexanal; alkenylbenzenes such as safrole, trans-anethole, myristicin and methyleugenol; ketones such as ionone, solanone; terpene alcohols such as linalool; and monocyclic or volatine terpenes such as cembrene and dihydroactinidiolide.

It is desirable to be able to extract constituents which may have flavourant and/or aroma properties from cellulosic material.

It is possible to extract components of cellulosic material using solvents. For example, CN 1166 753 discloses the use of petroleum ether and absolute ethanol, applied under hot or cold conditions to extract components from tobacco, thereby providing a "tobacco extractum". However, this method of extraction has the disadvantage that it requires a processing step to separate and remove the solvent from the extract, for example a filtration or distillation step. The need for an additional processing step to remove the solvent is time-consuming and costly, and can also result in removal of constituents of the cellulosic material which have similar physical properties to the solvent from the "extractum". For example, an extracted aromatic or flavour compound which has a similar boiling point to the solvent may be removed with the solvent as a result of separation by distillation, which distinguishes between components on the basis of boiling point. This can result in contamination of the solvent with the extracted aromatic or flavour compound, and loss of the flavour/aroma compound from the extract. It is also known that soluble components of cellulosic material can be extracted using solvents in the supercritical state. This process is known as supercritical extraction, or supercritical fluid extraction.

A supercritical fluid is any substance at a temperature or pressure above its thermodynamic critical point. When a fluid is close to its critical point, small changes in pressure or temperature result in large changes in properties such as density.

The basic principle of supercritical fluid extraction is that a feed material is contacted with a supercritical fluid, resulting in the partitioning of volatile substances within the feed material into the supercritical phase. After dissolution of any soluble material, the supercritical fluid containing the dissolved substances is removed, and the dissolved components of the feed matter are separated out from the supercritical fluid.

As used herein, "supercritical fluid" refers to a medium at a temperature and pressure at or above its critical point, preferably above its critical point. As temperature and pressure are increased along the liquid/gas phase line, the distinction between the liquid and gaseous states gradually disappears to a point, the so called "critical point", where the liquid and gaseous phases become one phase. Hence, supercritical fluids are characterised by physical and thermal properties that are between those of the pure liquid and gas. Accordingly, the expression "supercritical fluid" encompasses a medium having two phases when pressure and/or temperature are below and near the critical point and a medium with only one phase when pressure and temperature is at or above the critical point. Near and above the critical point the properties of the medium change rapidly with only slight variations of pressure and/or temperature. Supercritical fluids have solvating powers similar to liquid organic solvents, but have much higher diffusivities, lower viscosities and lower surface tensions and therefore readily penetrate porous and fibrous solids. The solvating power of supercritical fluids can, as a consequence, be adjusted by changing the pressure or temperature.

WO 01/65954 discloses a method comprising the use of a supercritical fluid extraction medium at elevated temperature and pressure, to treat tobacco in order to remove nitrosamines.

CN 1899142 discloses the use of supercritical $CO_2$ to remove the nicotine content from tobacco leaves.

Supercritical extraction has the advantage over other extraction techniques that the solvent can be removed from the extract without the need for an additional processing step. The system can be returned to atmospheric (or non-supercritical) conditions following extraction, thereby resulting in evaporation of the solvent. This has the advantage that the solvent in pure form (i.e. without being contaminated by extracted components) can be collected and recycled within the system, whilst none of the extracted constituents are lost to the solvent.

Supercritical extraction does not allow, however, for the selective removal of individual components from the feed material. If, therefore, it is desirable to remove a particular component(s) from the feed material, the desired component must be isolated from the supercritical fluid, and the remaining substances re-circulated back to the feed material.

For example, supercritical extraction can be carried out under conditions sufficient to extract essentially all solutes from cellulosic feed matter. Extraction is then followed by an isolation step, wherein the constituent components are separated from the supercritical fluid. An isolated component may be removed, whilst the other components are recycled with the supercritical fluid to the cellulosic feed matter, thereby effectively reconstituting the feed matter.

An example of this procedure is provided by EP 0 280 817, which discloses a process which aims to provide tobacco with reduced levels of nicotine, whilst levels of other components remain substantially unaffected. The process of EP 0 280 817 involves traversing tobacco with a solvent in the supercritical state or liquid state. The solvent is then passed through an acid-containing trap where it is essentially freed of nicotine. The solvent, depleted of nicotine, but still enriched with the other components that have partitioned into the supercritical phase, is recycled back to the cellulosic component of the tobacco.

CN 1459256 discloses the use of supercritical $CO_2$ extraction to remove harmful elements from tobacco. The supercritical $CO_2$ containing tobacco rag extract is fed into rectifying separators which contain adsorbing materials, such as activated charcoal, under pressure and a controlled temperature, in order to remove harmful tobacco components. The supercritical $CO_2$ is then brought back into contact with the tobacco rag and the temperature and pressure is lowered in order to effect transfer of the desired components back to the rag.

Means for isolating components from supercritical fluid are also known. For example, U.S. Pat. No. 6,637,438 discloses the use of high-pressure liquid chromatography (HPLC) to separate the fractions obtained by supercritical fluid extraction. However, methods of separation such as chromatography use solvents which are potentially toxic, environmentally unfriendly and/or flammable, and which are typically required to be removed from the components after isolation. Such solvents include benzene, cyclohexane, dimethylsulfoxide, acetonitrile, trifluoroacetic acid, triethylamine and methanol.

Furthermore, it can be very difficult to effectively isolate individual constituent components from a supercritical fluid. This is particularly the case where the desired component is present within the feed material in very small quantities, or when the property of the component by which it is isolated is very similar to that of other components found in the feed material. For example, chromatography techniques such as HPLC and gas chromatography rely upon differences in polarity between the samples to be separated. Gel filtration chromatography relies upon differences in molecular weight. It is therefore very difficult to isolate components which have a similar molecular weight or polarity using these techniques.

Another known method for separating a mixture of miscible liquids is distillation. Companies such as VTA Verfahrenstechnische Anlagen GmbH & Co. KG (Niederwinkling, Germany) have significant expertise in the field of distillation. Distillation is the process of heating a liquid until it boils, capturing and cooling the resultant hot vapours, and collecting the resultant condensed sample. It is possible to separate mixtures based on differences in the volatilities of components in a boiling liquid mixture using distillation. Idealized models of distillation are essentially governed by Raoult's law and Dalton's law.

Raoult's law assumes that a component contributes to the total vapor pressure of the mixture in proportion to its percentage of the mixture and its vapor pressure when pure.

Dalton's law states that that the total pressure exerted by a gaseous mixture is equal to the sum of the partial pressures of each individual component in a gas mixture. When a liquid mixture is heated, the vapour pressure of each component within the mixture will rise, thus causing the total vapor pressure to rise. When the total vapor pressure reaches the pressure surrounding the liquid, boiling occurs and liquid turns to gas throughout the bulk of the liquid. A mixture with a given composition has one boiling point at a given pressure, when the components are mutually soluble.

At boiling point, all volatile components of the mixture boil, but the percentage of a single component in the vapour is the same as its percentage of the total vapour pressure. Lighter components have a higher partial pressure and thus are concentrated in the vapor, but heavier volatile components also have a partial pressure and necessarily evaporate also, albeit being less concentrated in the vapour.

Typically, distillation is carried out using a fractionation column. The mixture is heated until it vaporizes. The vapour passes up the fractionation column, where it is gradually cooled. Different components of the vapour condense at different levels within the fractionation column, allowing the (now liquid) components of the original mixture to be separated.

A disadvantage of a simple distillation procedure, wherein a single vaporization and condensation phase is used, is that it would not effectively separate a mixture whose boiling points differs by less than 60-70° C. Repeated fractionating cycles, to try to separate mixtures with more similar boiling points, can be expensive, and still not achieve the aim of providing a pure distillate of one of the substances in the mixture, particularly where the components have the same, or very similar boiling point.

For example, CN 1166 753 discloses the use of multi-stage molecular distillation process to separate tobacco components from an extractum which has been obtained by exposure of crushed tobacco pieces to petroleum ether in hot or cold conditions.

The difficulties in effectively isolating individual constituent components from an extract provided by supercritical extraction presents a particular problem when considering the isolation of components from tobacco which impart a flavour or aroma to the tobacco. This is because many such components are similar in nature, and have similar physical properties, to components of tobacco which are considered undesirable.

For example, it can be desirable to ensure that isolated components are not contaminated with nitrosamines. Nitrosamines are a class of chemical compounds which were first described in the chemical literature over 100 years ago. Tobacco is known to contain certain nitrosamines, which are known as tobacco-specific nitrosamines (TSNAs). TSNAs consist of four chemical compounds: N-nitrosonornicotine (NNN); 4-methyl-N-nitrosamino-1-(3-pyridyl)-1-butanone (NNK); N-nitrosoanatabine (NAT); and N-nitrosoanabasine (NAB). TSNAs are not thought to be present in any significant amount in growing tobacco plants or fresh cut tobacco (green tobacco), but are thought to be formed during the curing and aging of tobacco.

Another compound that it may be desirable to selectively remove from a tobacco extract is benzo[a]pyrene (Ba]P), a polycyclic hydrocarbon which is found in the environment, and in tobacco smoke.

It can undesirable for constituents of tobacco that are isolated in order to utilize their desirable flavour or aroma characteristics to be significantly contaminated with benzo[a]pyrene and/or TSNAs. Such contamination has the potential to happen using some methods of isolating compounds, as a result of the similarity of the physical properties of these compounds to those of the constituents of tobacco which it is desirable to isolate.

It can also be undesirable for the constituents of the cellulosic material that are isolated in order to utilize their flavour or aroma characteristics to be significantly contaminated with nicotine. For example, it may be desirable to use such constituents in a nicotine-free product. Contamination by nicotine has the potential to happen using some isolation methods, as a result of the similarity of the physical properties of nicotine to those of the constituents of the cellulosic feed material which it is desirable to isolate.

For example, nicotine has a molecular weight of 162.24 g, and the flavourant safrole has a molecular weight of 162.2 g. Use of a standard gel filtration separation procedure, which isolates compounds from a mixture on the basis of their molecular weight could not, therefore, be used to obtain a substantially pure sample of safrole from a supercritical fluid which has been contacted with a feed material that also contained nicotine.

Table 2, below, details some of the physical properties of aroma compounds which are typically found in tobacco. Table 2 also provides details of the some of the physical properties of components of tobacco which can be considered undesirable.

TABLE 2

| Name | Flavour/taste description | BPt (° C.) | MPt (° C.) | MWt (g/mol) | Solubility (g/100 mL water) | Density (g/cm$^3$) |
|---|---|---|---|---|---|---|
| NNN | — | | 153 | 47 | 177.2 | |
| NNK | — | | | 71-73 | 207.23 | |
| NAT | — | | | | 189.21 | |
| NAB | — | | | | 191.23 | |
| B[a]P | — | | 495 | 179 | 252.31 | Insoluble | 1.24 |
| Nicotine | Bitter | 247 | −79 | 162.26 | Readily soluble | 1.01 |
| Solanone | Tobacco smoke | | | 194.31 | | |
| Benzaldehyde | Almonds | 178.1 | −26 | 106.12 | 0.6 | 1.0415 |
| Phenyl acetaldehyde | Honey like/ sweet/rose/grassy | 193 | −10 | 120.15 | | |
| Nonanal | Strong fruity/ floral | 195 | −18 | 142.24 | Insoluble | 0.827 |
| Cembrene | Faint wax like | 150-152 | | 272.47 | | |
| Linalool | Floral with hint of spiciness | 198-199 | <20 | 154.25 | 0.1589 | 0.86-0.87 |
| Methyl-tetradecanoate | Waxy with honey undertone | | | 242.4 | 0.866 | |
| Coumarin | *Vanilla* | 301 | 71 | 146.14 | | 0.935 |
| Pulegone | Mint, camphor | 224 | | 152.23 | Insoluble | 0.9346 |
| Piperonal | Fennel notes | 264 | 35-37 | 150.13 | | |
| trans-anethole | Anise/fennel | 234 | 20-21 | 148.2 | | 0.998 |
| Safrole | | 232-234 | 11 | 162.2 | | 1.096 |

TABLE 2-continued

| Name | Flavour/taste description | BPt (° C.) | MPt (° C.) | MWt (g/mol) | Solubility (g/100 mL water) | Density (g/cm$^3$) |
|---|---|---|---|---|---|---|
| Methyl eugenol | Spicy, woody, clove-like | 256 | −9 | 164.2 | | 1.06 |
| Myristicin | nutmeg | 173 | <25 | 192.2 | | 1.1437 |

NNN: N-nitrosonornicotine;
NNK: 4-methyl-N-nitrosamino-1-(3-pyridyl)-1-butanone;
NAT: N-nitrosoanatabine;
NAB: N-nitrosoanabasine;
B[a]P: benzo[a]pyrene
Mwt: molecular weight;
BPt: Boiling point;
Mpt: Melting point Contamination of one or more desired constituents with undesirable compounds results in the need to process the sample further. This can be costly and time-consuming.

JP 9-10502 discloses a procedure to extract an "objective component", such as nicotine, from a natural solid raw material, involving bringing the raw material into contact with a first high pressure fluid. The fluid, and the components dissolved therein, are then brought into contact with an absorbent. The absorbent-soluble components are then brought into contact with a second high pressure fluid, which has been subjected to a temperature gradient. The temperature gradient ensures that only the objective components are dissolved in the second high pressure fluid. The second high pressure fluid containing the objective components is introduced into a separator where the objective component(s) are separated out by reducing the solubility of the objective component in the second high pressure fluid.

WO 2007/053096, which is concerned with the isolation and removal of nitrosamines from tobacco, discloses a method which requires more than 10 processing steps.

An object of the present invention is to provide a simple process which allows the selective isolation of components from cellulosic feed material.

In particular, it is an object of the invention to provide a simple process which allows the isolation of compounds which are similar in boiling point and/or vapour pressure.

A further object of the invention is to provide a process which comprises less than 5 processing steps.

It is a further object of the invention to provide a process which is relatively environmentally friendly, in that it does not require polluting separation matrices.

It is also an object of the invention to provide a process which does not require the use of a potentially toxic or flammable extraction solvent in order to extract soluble components from the cellulosic material; and which does not require the use of a solvent in order to isolate constituents from the extract.

A further object of the present invention is to provide a method which has a high degree of controllability in terms of the instruments and/or machinery that is commercially available to carry out the steps.

It is a further object of present the invention to provide a process which is relatively inexpensive.

A further object of the invention is to provide a process which is relatively clean, in that the machinery involved in the process does not require excessive cleaning cycles to be returned to original working order.

SUMMARY OF THE INVENTION

Accordingly, in a first aspect of the present invention, there is provided a process for extracting and isolating constituents from cellulosic material, the process comprising:

(a) contacting the cellulosic material with a supercritical fluid under conditions to provide an extract;
(b) removing the insoluble material from the extract; and
(c) fractionating the extract by distillation to provide one or more isolated constituents.

The phrase "constituents of cellulosic material" or "constituents from cellulosic material" as used herein, pertains to compounds which can be solubilised by the supercritical fluid.

DETAILED DESCRIPTION OF THE INVENTION

Examples of fluids which can practically be used in supercritical applications are: carbon dioxide, sulphur hexafluoride, nitrous oxide, halogenated hydrocarbons having up to 4 carbon atoms such as $CF_4$, $CHF_3$, $CClF_3$, $CBrF_3$, $CF_2$=$CH_2$, $CF_3$—$CF_2CF_3$, $CHClF_2$, $CCl_2F_2$, $CHCl_2F$, $CCl_3F$, $CBrF_3$, $CFCl$=$CF_2$, $CH_3$—$CF_3$, octafluorocyclobutane, and hydrocarbons including up to 7 carbon atoms such as propane, butane, pentane, hexane, cyclohexane, toluene, ethanol, acetone, methyl acetate, diethyl ether, dichloromethane, carbon tetrachloride. Other useful fluids include $N_2O$, $SF_6$ and argon.

In preferred embodiments, the supercritical fluid is not a toxic, flammable or environmentally-unfriendly extraction solvent. Accordingly, in some embodiments, the supercritical fluid is not methanol or hexane. In preferred embodiments, the supercritical fluid is carbon dioxide ($CO_2$).

The cellulosic material may be derived from any species from the kingdom of Plantae, such as trees, flowers, herbs, bushes, grasses, vines, ferns, mosses and the like.

In certain embodiments, the cellulosic material is derived from mullein, cloves, mint, tea, *Eucalyptus*, or camomile.

In preferred embodiments, the cellulosic material is derived from vascular plants, and most preferably seed-bearing vascular plants, such as Pinophyta (conifer), Cycadophyta (cycades), Ginkophyta (ginkoes), Gnetophyta (gnethopytes), and Magnoliophyta. Families of plant matter residing under the division of Magnoliophyta include Cannabaceae, which include the genus *Humulus* (hops), and Solanaceae, which is also referred to as nightshade plants or potato family. Within the family Solanaceae, *Nicotiana* is a specifically preferred genus, and specifically preferred cellulosic material for use in the present invention is *Nicotiana* species referred to as tobacco plants or simply tobacco.

Tobacco contains well over 3000 compounds ranging from the fibrous matrix, e.g. high molecular weight polymeric compounds such as cellulose, and a variety of intermediate molecular weight constituents being mostly non-volatile, e.g.

hemicellulose and lignin, and low molecular weight constituents, including aroma and flavour compounds.

Examples of tobacco components include carotenoid derivatives, alkaloids, nitrosamines, humectants, metals, non-polymeric compounds exemplified by nicotine, nornicotine, anabasine, myosmine, antabine, glycerol, propylene glycol, triethylene glycol, ammonia, nickel, lead, cadmium, chromium, arsenic, selenium, mercury, benzo[a]pyrene, nitrate, triacetin, sodium propionate, sorbic acid, and eugenol.

In preferred embodiments of the invention, the constituents of cellulosic material extracted and isolated by a process according to the first aspect of the present invention have flavourant and/or aroma properties, in that they impart a flavour or aroma to the cellulosic material from which they are isolated, or to cellulosic material to which they are subsequently added.

In some embodiments, the constituent may be one or more of coumarin, pulegone, phenyl acetaldehyde, nonanal, cembrene, linalool, ionone, geranylacetone, 3-methylbutanal, pentanal, hexanal, benzene ethanol, methyltetradecaonate, benzaldehyde, piperonal, trans-anethole, solanone, di-hydroactinidiolide, safrole, methyl eugenol, myristicin and adjuvants or derivatives thereof.

In preferred embodiments, the constituents of cellulosic material extracted and isolated by a process according to the first aspect of the present invention are substantially free of nicotine, one or more nitrosamines and/or benzo[a]pyrene. In most preferred embodiments, the constituents of cellulosic material extracted and isolated by a process according to the first aspect of the present invention are substantially free of nicotine.

In preferred embodiments, constituents isolated according to the present invention are substantially pure.

In certain embodiments, constituents isolated according to the present invention are between 80-100%; 90-100%; 95-100%; 98-100%; 99-100%; or 99.5-100% pure. In some embodiments, the isolated constituents are between 75-95% pure; 75-90% pure; or 85-90% pure.

The term "pure" as used herein means that the isolated constituent(s) consists of the desired constituent(s) only, and are not contaminated with other constituent(s) of the cellulosic material.

In preferred embodiments, the cellulosic material used in methods according to the first aspect of the invention comprises or consists of material from the stem or lamina of a plant. In particularly preferred embodiments, the cellulosic material comprises or consists of tobacco stem or tobacco lamina. In most preferred embodiments, the cellulosic material used comprises or consists of tobacco lamina. Typically, the majority of flavour compounds are held within the lamina portion of the leaf of a plant, and use of the lamina in methods according to the present invention thus improves the yield of flavourant/aroma compounds. However, the lamina also contains the majority of the sugars and nicotine. Further to this, the majority of nitrosamines and B[a]P are found in the lamina of flue-cured viriginia tobacco, and in the lamina and stem of air cured Burley tobacco. Thus, constituents extracted from the lamina are likely to be contaminated with nicotine, and/or one or more nitrosamine and/or B[a]P.

The cellulosic material can optionally be treated in one or more ways before the supercritical extraction step, as recited in step (a) of the first aspect of the present invention, in order to obtain optimal extraction characteristics. For example, the cellulosic material may be pre-treated with chemical bases such as ammonium bicarbonate.

Alternatively, or in addition, the cellulosic material can be pre-hydrated prior to supercritical extraction. This can be done by, for example, taking cellulosic material of a known moisture content (as established through standard analysis procedures), and placing a known weight in a receptacle with a desired amount of water. The cellulosic material and water are mixed, and the receptacle is sealed and left for approximately 24 hours at around 4° C. to allow equilibration. Moisture content can be established by testing a sample of the cellulosic material using standard analysis procedures.

The water content of the cellulosic material should preferably not exceed a level where an aqueous slurry is formed which results in disintegration of the cellulosic material. Typically, prior to extraction with a supercritical fluid, the cellulosic material, specifically tobacco, has a moisture (water) content from less than 10% by weight up to about 50% by weight; preferably from less than about 10% up to about 35% by weight; more preferably from less than about 10% to about 20% by weight; and even more preferably less than 1, 2, 3, 4 or 5% up to about 10% moisture content by weight.

Pre-treatment of the cellulosic material with, for example, water, can be used to shift the balance in the types of constituents of the cellulosic material that are extracted using processes according to the present invention. Hydration of the cellulosic starting material can affect the balance of compounds extracted, as a result of mixing of the water with the supercritical fluid. This mixing results in a change in the polarity and/or pH of the supercritical fluid/water extraction solvent in comparison to the polarity and/or pH of the supercritical fluid where minimal water is present.

Pre-treatment of cellulosic material by milling, comminution or otherwise reducing its size (e.g. to create cut rag) can lead to enhanced extraction capabilities, as a result of the resultant increase in the surface area of cellulosic material which is exposed to the extraction solvent. This allows the extraction liquid used during step (a) of a process according to the first aspect of the present invention to be brought into intimate contact with the cellulosic material.

Any pressure and temperature can be applied during the supercritical extraction as long as the fluid is at or above the critical point. For carbon dioxide the temperature can be as low as around 30° C., more preferably at least about 31.1° C. Suitably the temperature is at least about 35° C., preferably about 40° C., and may be at least about 100° C. The temperature may range from about 30° C. to about 150° C.; more preferably from about 35° C. to about 100° C.; even more preferably from about 35° C. to about 80° C.

The pressure applied during extraction can be any pressure at or above the critical pressure of the supercritical fluid employed in the method. For carbon dioxide, the pressure can be as low as around 7.0 MPa, preferably the pressure is at least about 7.38 or 7.382 MPa. More preferably, the pressure is at least about 15 MPa; more preferably at least about 25 MPa; and even more preferably at least 30 MPa. The pressure is preferably from about 7.382 MPa to about 100 MPa; more preferably from about 15 MPa to about 80 MPa; and most preferably from about 20 MPa to about 60 MPa.

When using carbon dioxide as the supercritical fluid, a temperature during supercritical extraction of 40° C. and a pressure 30 MPa (300 bar) is particularly preferred.

In a particularly preferred embodiment, supercritical extraction is performed using 70 kg of carbon dioxide as the supercritical fluid per kg of a cellulosic material, at a temperature during supercritical extraction of around or exactly 40° C. and a pressure of around or exactly 30 MPa.

A temperature of 40° C. and a pressure of 30 MPa have been found to provide optimal solvating power for tobacco, thereby ensuring that as many and as much of the volatile substances in the tobacco feed material are removed and partitioned into the supercritical phase.

The duration of contacting the cellulosic material with the supercritical fluid can vary and is suitably of such a length so as to permit the removal of at least 20% by weight of the solutes from the cellulosic material. The duration of the extraction is influenced by the type of supercritical fluid used, the type of cellulosic material used, the shape of the cellulosic material, the extraction conditions used and the type of extraction vessel. Typically, the cellulosic material is in contact with the supercritical fluid for at least 5 minutes; more preferably for at least 20 minutes; and most preferably for at least 60 minutes.

Cleaning of the extraction machinery following supercritical extraction according to the invention may be achieved by performing one or more "dry runs", by passing a supercritical solvent through the machinery in the absence of any cellulosic feed material. Embodiments of the present invention which utilize a non-toxic or non-flammable/environmentally-friendly extraction supercritical fluid, such as carbon dioxide ($CO_2$), as in preferred embodiments of the invention, facilitate the cleaning process. This is particularly the case where the machinery is used for a single type of cellulosic feed material, such as tobacco.

After supercritical extraction, the supercritical fluid comprising the solutes from the cellulosic material is separated, preferably under maintained supercritical conditions, from the cellulosic material. This separation gives rise to an extract, also referred to as extraction medium/extraction solution, and a raffinate, which is the depleted (insoluble) cellulosic material. Separation of the raffinate from the extract can be accomplished by any suitable separation means, such as filtering, decanting, sedimentation or sieving.

The solutes within the extract are then separated by distillation. It has been found possible using the present invention to achieve a high sensitivity in the distillation process. This allows the separation of constituents within the extract that have very similar boiling points, such as boiling point differences of 5-10° C. or lower, thus allowing the isolation of aroma compounds, whilst minimizing the contamination by undesirable substances, such as nitrosamines, B[a]P and/or nicotine. Such sensitivity is achieved by careful selection of the parameters involved in the distillation process, and in particular, the temperature(s) and pressure(s) used during distillation, and the speed of introduction of the extract to the distillation chamber.

By carefully controlling certain parameters during the distillation process, even small quantities of cellulosic material constituents may be isolated from the extraction solvent. The extracted constituents can be in highly concentrated form, and this can be beneficial, as only a very small amount of the constituent may be needed to provide or enhance the flavour or aroma of the product into which it is incorporated. This means that the process is efficient and cost-effective.

In preferred embodiments according to the present invention, distillation is carried out under a depressed pressure (in comparison to atmospheric pressure). This may be achieved by carrying out the distillation process in a vacuum. Vacuum distillation works on the principle that boiling occurs when the vapour pressure of a liquid exceeds the ambient pressure. For example, nicotine boils at 247° C. at atmospheric pressure, but at 124° C. at 0.022 atm (17 torr; 22.6 millibar (mbar)). Use of a depressed pressure can thus make the distillation process more efficient and more cost-effective.

In certain embodiments, the distillation step according to the first aspect of the present invention is molecular distillation. By "molecular distillation" is meant the use of vacuum distillation to provide a very low pressure(s), such as below 5, 2, 1 or 0.5 mbar.

Depending upon the supercritical extraction conditions used, the extract that results from the supercritical extraction step according to methods of the present invention may be water rich, comprising around 80% water. In some cases, the extract may comprise a water content of up to 98%. Accordingly, in some embodiments according to the present invention, the first distillation step may involve the removal of excess water. It can be advantageous to remove excess water from the extract prior to carrying out further stages of the distillation, as the resultant constituents isolated from the extract will then be more concentrated. Furthermore, it is not possible to condense the water at very low pressures, such as those that may be used during later stages of the distillation process, and the presence of excess water can affect the suction capability of any vacuum pump used. Removing water as part of the initial distillation thus helps to improve the efficiency of further distillation steps. Accordingly, in certain embodiments, water-rich extracts are heated to 100-110° C., optionally under a depressed pressure, such as 100-130 mbar. In preferred embodiments, a temperature of 100-110° C. and a pressure of 100 mbar are used.

The distillation process typically gives rise to three fractions: a 'heavy' fraction (otherwise known as the 'residue'); a 'medium' fraction (otherwise known as the 'distillate'); and a 'light' fraction (otherwise known as the 'cold trap sample'). The partitioning of elements within the extract into the various fractions is determined by volatility: waxes and the like typically accumulate in the residue; more volatile substances typically accumulate in the distillate; whilst the most volatile substances accumulate in the cold trap. In instances where the extract is water-rich, the distillate may be water-rich.

In preferred embodiments, the extract is introduced into the distillation chamber under continuing conditions of reduced pressure, preferably created by the use of a vacuum, and heat. By introducing the extract under such conditions, and at an appropriate rate, a thin film of extract is formed within the chamber. The volatile components begin to evaporate from the film, and the system is sensitive enough to allow condensation of components of different volatilities at particular locations (so-called "cold fingers") within the apparatus, from where they can be removed, thus effectively separating the components within the extract. By adjusting the vacuum, temperature, speed of introduction of the extract and thus the rate of flow of the thin film formed within the chamber, the relative proportions of the "light" and "heavy" fractions remaining in the extract can be controlled.

The cold trap is typically used to collect any super-volatile components that do not condense onto the cold fingers, but remain volatile under the conditions used. In some embodiments the cold trap may simply serve to protect any vacuum pumps being used from the most volatile components.

In preferred embodiments, the extract is introduced into the distillation chamber slowly enough to allow formation of a thin film within the chamber.

In preferred embodiments, the first distillation step involves heating the extract to a temperature of between 100-110° C., under a depressed pressure, such as 90-130 mbar. More preferably, a temperature of 100-110° C. and a pressure of about 100 mbar is used. The distillate and cold trap samples are removed from the system and the distillation parameters may then be altered, in order to obtain additional fractions.

Accordingly, in certain embodiments, the residue resulting from the first distillation step is fractionated further by alteration of the pressure within the system to between 1 and 5 mbar, more preferably 1 and 3 mbar, and most preferably a pressure of 2 mbar is used; with an initial temperature of between 110 and 180° C.; more preferably between 120-160° C.; even more preferably between 135 and 155° C., and most preferably an initial temperature of 150° C.; reducing to between 110 and 150° C., and more preferably 140° C.

One or additional distillation runs may be performed, by further altering the pressure and/or temperature of the system, thus giving rise to additional fractions. For example, from an initial temperature of between 110 and 180° C.; more preferably between 120-160° C.; even more preferably between 135 and 155° C., and most preferably 150° C.; the temperature of the system may be reduced to between 110 and 140° C., and more preferably 130° C., whilst maintaining a pressure within the system of between 1 and 5 mbar, more preferably and 3 mbar, and most preferably a pressure of 2 mbar.

The fractions obtained from the distillation process can be concentrated for use as aroma compounds, for example by heating to remove excess water.

The amounts of nicotine, B[a]P and TSNAs in the fractions can be determined using standard operating procedures, such as those outlined in Examples 2 and 3 below, with which the skilled person would be conversant.

The use of supercritical extraction to extract constituents from cellulosic material, followed by fractionation of the extract using distillation in a manner which allows selective isolation of one or more components from within the extract, confers several advantages over known techniques for separating and isolating constituents of cellulosic material.

Firstly, the process according to the present invention allows the isolation of compounds which are similar in boiling point and vapour pressure. This means that compounds within cellulosic material can be extracted and isolated with accuracy, giving rise to samples which are substantially pure.

The process is simple in contrast to known extraction/isolation techniques, comprising, in some embodiments, less than 5 processing steps.

The present process is relatively environmentally friendly as it does not require polluting separation matrices such as silicas, aluminas or beads in order to separate constituents of the cellulosic material from the extraction solvent. The absence of separation matrices also means that the present process is relatively inexpensive.

Furthermore, the step of fractionating the extract in order to isolate constituents does not require the use of a solvent. This avoids the environmental and health risks associated with the use of many solvents. It also reduces cost, as the removal of a solvent from a system can be energy-intensive and, therefore, expensive.

In addition, in preferred embodiments according to the first aspect of the invention, the step of extracting soluble components from the cellulosic material does not require the use of a potentially toxic, environmentally-unfriendly or flammable extraction solvent, such as methanol or hexane. This again avoids the environmental and health risks associated with the use of such solvents, and reduces the cost associated with removing such solvents from the system.

The process is also relatively clean, as it does not require excessive cleaning cycles in order to return the extracting and/or distillation machinery to original working order. This is particularly the case where the machinery is used solely for processing cellulosic material, and in particular, for processing tobacco.

The process has a high degree of controllability in terms of the instruments and/or machinery that is commercially available to carry out the steps. For example, equipment which is commercially available typically allows careful control of the pressures and times involved in the supercritical extraction procedure; and temperatures, time and pressures involved in the distillation procedure. This enables the process to be conducted under very precise conditions. This also means that conditions under which extraction and isolation are conducted can be varied greatly, in order to optimize isolation of particular compounds.

The process according to the first aspect of the invention thus allows isolation of constituents from cellulosic material which are either substantially free from one or more of: nitrosamines, and in particular, one or more tobacco specific nitrosamines (TSNAs); nicotine; and benzo[a]pyrene (B[a]P), or which have reduced levels of one or more of these compounds in comparison to the cellulosic material from which they were isolated, or from the cellulosic material from which they were isolated when concentrated and/or processed to a comparable extent.

In a further aspect of the present invention there is provided one or more constituents of cellulosic material obtainable by a process according to the first aspect of the invention.

In preferred embodiments, the isolated constituents impart a flavour or aroma to the cellulosic material from which they are isolated, or to cellulosic material to which they are subsequently added.

In some embodiments, the constituent may be one or more of coumarin, pulegone, phenyl acetaldehyde, nonanal, cembrene, linalool, ionone, geranylacetone, 3-methylbutanal, pentanal, hexanal, benzene ethanol, methyltetradecaonate, benzaldehyde, piperonal, trans-anethole, solanone, di-hydroactinidiolide, safrole, methyl eugenol, myristicin and adjuvants or derivatives thereof.

Constituents isolated according to the present invention can be used to enhance the flavour of tobacco for use in tobacco products. Alternatively, such constituents could be used to create, or as part of, tobacco-free products, such as tobacco- or nicotine-replacement products. For example, constituents isolated according to the present invention could be incorporated into lozenges, or inhalation products such as those used by people who are giving up smoking.

Alternatively, constituents isolated according to the present invention could be used to create products which provide the user with a particular taste or aroma sensation, for example, isolated constituents could be incorporated into dissolvable strips or films, lozenges, capsules, nasal sprays, oral sprays, aerosols and chewing-gums.

In preferred embodiments, constituents isolated according to the present invention are either substantially free from one or more nitrosamines, and in particular, tobacco specific nitrosamines (TSNAs), nicotine and/or benzo[a]pyrene (B[a]P), or have reduced levels in comparison to the cellulosic material from which they were isolated, or from the cellulosic material from which they were isolated when processed and/or concentrated to a comparable extent.

In preferred embodiments, the nicotine content of constituents isolated according to the present invention is less than 25 mg/ml, and more preferably less than 20, 19, 18, 17 or 16 mg/ml.

In preferred embodiments, the total TSNA content in constituents isolated according to the present invention is less than 8, 7, 6.9 or 6 µg/ml; more preferably less 5, 4, 3, 2 or 1 µg/ml; and even more preferably less than 0.5 or 0.1 µg/ml.

In preferred embodiments, the level of nitrosonornicotine (NNN) in constituents isolated according to the present invention is less than 3.5 µg/ml; more preferably less than 3 µg/ml; and even more preferably less than 2 µg/ml or below the level of quantification.

In preferred embodiments, the level of 4-methyl-N-nitrosamino-1-(3-pyridyl)-1-butanone (NNK) in constituents isolated according to the present invention is less than 1.7 µg/ml; more preferably less than 1.6 µg/ml; and even more preferably less than 1.5 µg/ml or below the level of quantification.

In preferred embodiments, the level of N-nitrosoanatabine (NAT) in constituents isolated according to the present invention is less than 2.4 µg/ml; more preferably less than 2 µg/ml; and even more preferably less than 1.8 µg/ml, or below the level of quantification.

In preferred embodiments, the level of N-nitrosoanabasine (NAB) in constituents isolated according to the present invention is less than 0.14 µg/ml; and more preferably less than 0.1 µg/ml, or below the level of quantification.

In preferred embodiments, the level of benzo[a]pyrene in constituents isolated according to the present invention is less than 40 ng/g; preferably less than 30 ng/g; more preferably less than 25 or 20 ng/g, even more preferably less than 10 or 5 ng/g, and most preferably less than 1, 0.5, 0.4, 0.3, 0.2 or 0.1 ng/g.

In certain embodiments, constituents isolated according to the present invention are between 80-100%, 90-100%, 95-100% or 98-100% pure. In some embodiments, constituents isolated according to the present invention are between 75-95% pure, 75-90% pure or 85-90% pure.

In a further aspect of the present invention, there is provided an apparatus for extracting constituents from cellulosic material, comprising a means for contacting cellulosic material with supercritical fluid under conditions sufficient to extract one or more solute(s) from the plant matter, thereby forming an extract and a raffinate; a means for separating the extract from the raffinate; and distillation means to separate one or more constituents from within the extract.

Apparatus which permits operation under conditions in which extraction solvent is present in the supercritical state is known in the art, and typically comprises one or more pressure-resistant containers and associated plant components.

In certain embodiments, the apparatus comprises an extraction tank, into which a supercritical fluid, such as supercritical carbon dioxide, is introduced from a working tank via one or more pumps. The carbon dioxide may be conducted through a heat exchanger to bring it to process temperature. The carbon dioxide is then brought into intimate contact with the plant matter. This may be carried out by conducting the supercritical fluid through one or more containers connected in parallel, which contain the plant material.

Means of separating the extract from the raffinate are known in the art. In certain embodiments, the separation means comprises a buffer tank or separator vessel, which contains a trap for basic constituents, thereby removing particulate and/or certain dissolved or suspended matter.

Distillation means are known in the art, and typically comprise a distillation flask, a distilling head or fractionation column, a means of monitoring temperature, a condenser and one or more receiving vessels. The distilling head/fractionation column connects the condenser with the distillation flask. The means of monitoring temperature is typically located at the branch of the distilling head, in order to measure the temperature of the vapour gas. The condenser is typically a double-layered column that has cold water flowing in the outer layer. Boiling chips may be added to the distillation flask to permit even boiling. The system may further comprise a means for disposing of separated solute(s).

EXAMPLE 1

(i) Supercritical $CO_2$ Extraction

Approximately 5 kg of tobacco was extracted with supercritical $CO_2$. The cut rag tobacco was extracted using a $CO_2$ extraction plant, under the conditions set out in Table 3:

TABLE 3

Conditions for the Supercritical $CO_2$ Extraction of Cut Rag Tobacco

| Conditions | Detail |
| --- | --- |
| Extraction solvent: | Supercritical $CO_2$ at 30 MPa and 40° C. |
| Flow rate: | 8 kg $CO_2$ per hour |
| No. of charges* | 16 |
| Charge references | CX249/090-CX249/105 |
| Raw Material per charge | 308.9 g ± 1.5 |
| kg $CO_2$ per kg tobacco | 69.0 ± 1.5 |
| Extract yield | 9.0% w/w ± 0.1% w/w |
| Total amount tobacco extracted | 4941.8 g |
| Total amount of extract | 443.2 g |
| Total amount of spent tobacco | 4491.8 g |
| Yield of extract | 8.97% |

*The extracts from all charges except charge 6 were pooled and placed in cold store for intermediate storage for distillation. The extract from charge 6 was also placed in cold store, for analysis.

The yield of crude extract from the supercritical $CO_2$ extraction of 4941.8 g cut rag tobacco was 443.2 g (8.97%). A sample of this was sent for analysis and the remaining quantity (307.9 g) was fractionated using distillation.

(ii) Distillation

The tobacco extract (416.65 g) to be distilled was a water-rich suspension of waxy solids. The water content of the extract was estimated to be 80%. The process for distillation was as set out below.

1. First stage distillation, including water removal, was carried out by operating the system at 130 mbar pressure and 100° C. A residue of 61.4 g was obtained, with a distillate (Fraction 1) of 246 g, i.e. a 20:80 split, as expected from the estimated amount of water in the crude tobacco extract.

2. The residue from stage 1 above was further fractionated at a pressure of 2 mbar, and an initial temperature of 150° C., reduced to 140° C. (to provide Fraction 2), during which there was some charring of the residue, and 130° C. (to provide Fraction 3).

Figure 1:
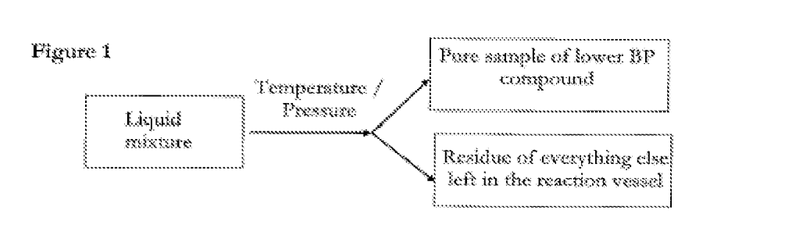
FIG. 1 is a schematic of the steps in a typical distillation process.
Figure 2:
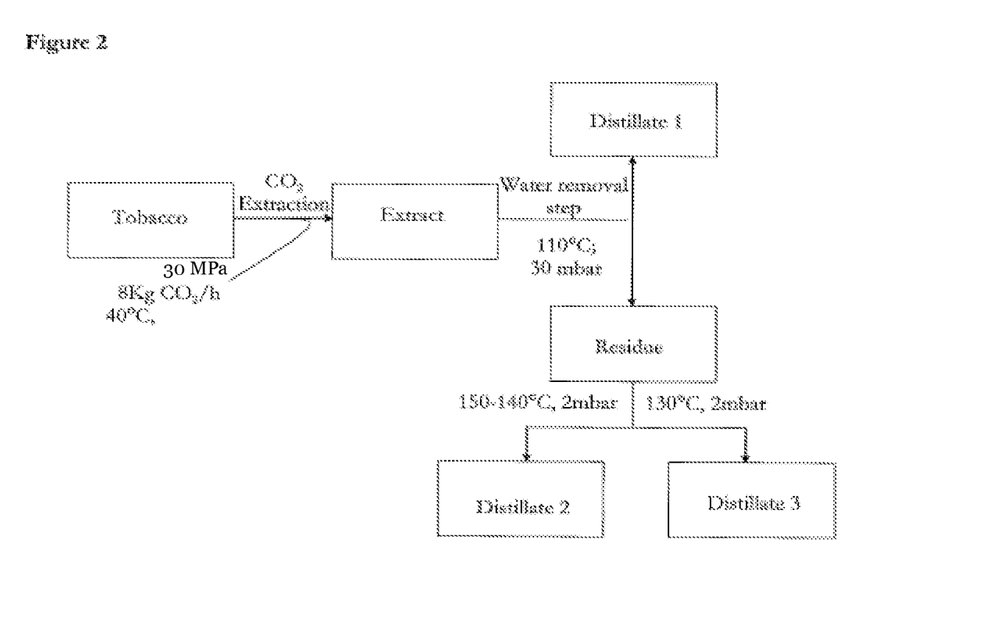
FIG. 2 is a flow chart describing the extraction and distillation process for an embodiment according to a first aspect of the present invention.
Figure 3:
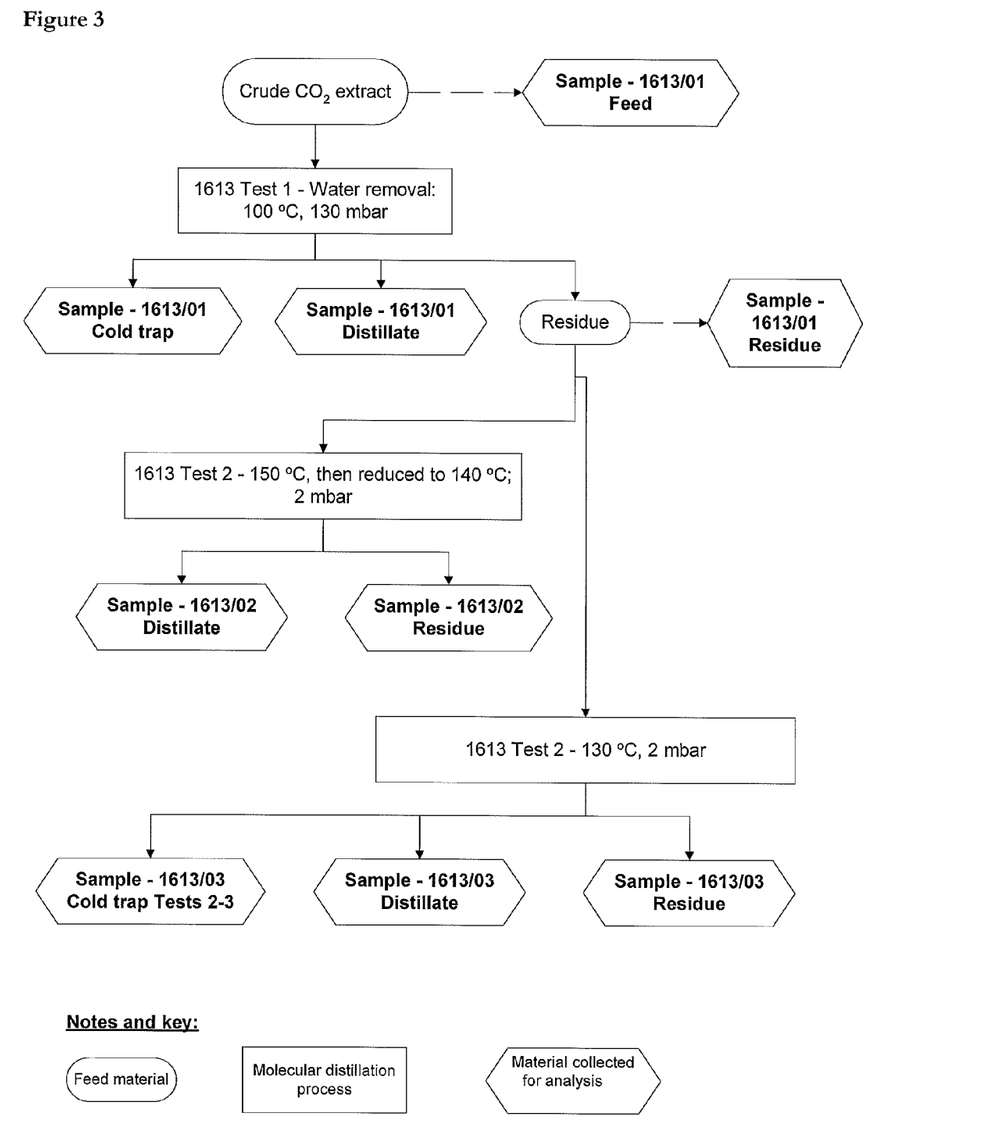
FIG. 3 is a flow chart of the sequence of distillation events as used in Example 1, below. It should be noted that materials from the waste streams were collected during start-up and shut down of the distillation units detailed in the chart, and during changes in parameters (e.g. temperature and pressure). Thus waste was generated when the units were running at unstable conditions.

The sequence of distillation events and how the samples were collected is shown in FIG. 3. There were nine samples for analysis. In addition, there were four waste streams, which were collected during the start-up or shut-down phases of the distillation, i.e. while the distillation units were not running under stable conditions.

TABLE 4

Sample Details from Distillation

| Fraction | Number | Sample | Details |
|---|---|---|---|
| 1 | 1613/01 | Feed | Sample of feed material |
|  | 1613/01 | Distillate | Distillate obtained from first distillation |
|  | 1613/01 | Residue | Sample remaining after first distillation |
|  | 1613/01 | Cold Trap | Volatile materials collected in the cold trap after first distillation |
| 2 | 1613/02 | Distillate | Distillate obtained from distillation of residue 1613/01 under conditions of 140° C. and 2 mbar |
|  | 1613/02 | Residue | Sample remaining after distillation |
| 3 | 1613/03 | Distillate | Distillate obtained from distillation of residue 1613/01 under conditions of 130° C. and 2 mbar |
|  | 1613/03 | Residue | Sample remaining after distillation |
|  | 1613/03 | Cold Trap | Volatile materials collected in the cold trap from tests 2 and 3 |

Results

The first distillation step afforded 246.0 g of Fraction 1 (1613/01 distillate; 79.9%).

The residue from this step, "1613/01 Residue" (yield=61.4 g, 19.9%), was split and used for a distillation under two different conditions: 1) distillation of 10.7 g of 1613/01 Residue under 2 mbar pressure, initially at 150° C. then reducing to 140° C., afforded 3.3 g of Fraction 2 (distillate 1613/02; 30.8%); and 2) distillation of 14.0 g of 1613/01 Residue under 2 mbar pressure at 130° C., afforded 3.7 g of Fraction 3, (distillate 1613/03; 26.4%).

The amounts of nicotine, benzo[a]pyrene and TSNAs in the tobacco feed material, the crude extract and distillation Fractions 1-3 were determined using standard procedures which would be familiar to a person skilled in the art, as detailed in Examples 2 and 3. The results are provided in Table 5, below, together with the corresponding yield information.

TABLE 5

Analyte and Reaction Yields from Distillation of Tobacco Extract

| Details | Tobacco | Crude Extract | Fraction 1 | Fraction 2 | Fraction 3 |
|---|---|---|---|---|---|
| Customs No. | CR07/00025 | — | — | — | — |
| Code | CRT B297 | — | — | — | — |
| PSP-Code | PA-07-1040 | PA-07-1272 | PA-08-0283 | PA-08-0283 | PA-08-0283 |
| Starting material (g) | — | 4941.8 | 307.9 | 10.7 | 14.0 |
| Yield (g) | — | 443.23 (9.0%) | — | — | — |
| Distillate (g) | — | — | 246.0 (79.9%) | 3.3 (30.8%) | 3.7 (26.4%) |
| Residue (g) | — | — | 61.4 (19.9%) | 7.3 (68.2%) | 10.2 (72.9%) |
| Cold Trap (g) | — | — | 0.6 (0.2%) | 0.1 (1.0%) | 0.1 (0.7%) |
| Nicotine (mg/mL) | 23.1 | 42.40 | 15.45 | 54.00 | 63.50 |
| Reducing Sugar (mg/mL) | 100.0 | 12.0 | — | — | — |
| Total Sugar (mg/mL) | 109.0 | 18.0 | — | — | — |
| NAB (µg/mL) | 0.04 | 0.204 | 0.002 | 3.57 | 1.85 |
| NAT (µg/mL) | 0.58 | 2.98 | 0.026 | 53.4 | 29.0 |
| NNK (µg/mL) | 0.49 | 3.61 | 0.011 | 28.0 | 9.07 |
| NNN (µg/mL) | 0.83 | 6.22 | 0.042 | 82.3 | 41.8 |
| Total TSNA content (NAB + NAT + NNK + NNN) (µg/ml) | 1.94 | 13.014 | 0.081 | 167.27 | 81.72 |
| B[a]P (ng/g) | 41.2 | 0.40 | <0.40 | 137.93 | 23.76 |
| NIR water (%) | 12.7 | — | — | — | — |
| Oven Moisture (%) | 13.3 | — | — | — | — |

Limits of Quantification (LOQs): B[a]P = 0.04 ng/g; TSNAs: NAB = 0.04 µg/g; NAT = 0.08 µg/g; NNK = 0.08 µg/g; NNN = 0.08 µg/g For comparison, processed tobacco (i.e. tobacco which has been concentrated and processed to a comparable extent to the tobacco used in the present Example, and which is ready for incorporation into a smoking product) typically has the following levels of tobacco-specific nitrosamines, nicotine and B[a]P:

Nicotine (based upon blend tobacco): 24 mg/g
B[a]P: 0.8 ng/g
TSNAs:
NAB: 140.55 ng/g (0.1405 µg/g)
NAT: 2473.78 ng/g (2.474 µg/g)
NNK: 1791.49 ng/g (1.791 µg/g)
NNN: 3539.25 ng/g (3.539 µg/g)
Total TSNA content: 7945.07 ng/g (7.945 µg/ml)

As can be seen from Table 5, Fraction 3 contains significantly less B[a]P than the tobacco feed material.

Further to this, the levels of all TSNAs in Fraction 1 are below the Limit Of Quantification [LOQ]. In addition, the level of each of NAB, NAT, NNK NNN, B[a]P and nicotine in Fraction 1 is lower than the comparable levels in the unprocessed tobacco starting material. In addition, the level of each of NAB, NAT, NNK, NNN, B[a]P and nicotine in Fraction 1 is lower than the comparable levels in tobacco processed to a comparable extent.

Fraction 1, however, is an aqueous distillate. The amount of nicotine, TSNA (total content), and B[a]P in Fraction 1, if concentrated (by removing the water, for example by freeze-drying) to provide a distillate of 3.5 g, are approximately as follows:

Nicotine 1085.1 mg/ml
B[a]P: <28.11 ng/ml
Total TSNA content: 5.69 µg/ml

Accordingly, Fraction 1 in concentrated form contains significantly less B[a]P than the unprocessed tobacco starting material; and a lower total TSNA content than tobacco processed to a comparable extent.

EXAMPLE 2

Method for Determination of Levels of b[a]P (Up to a Concentration of 5 ng/g)

In summary, a 2 g test sample is extracted in methanolic KOH and cleaned using liquid/liquid separations. The sample is then analysed by gas chromatography mass spectrometry (GCMS) and corrected for moisture, to give a result of ng/g on a dry weight basis.

Reagents:
Extracting Solution
60 g KOH in approximately 500 ml methanol and 100 ml water. The mixture is stirred until cool, and any drop in volume corrected by addition of methanol.

Dimethylformamide (DMF)/H$_2$O Solution
100 ml H$_2$O and approximately 500 ml DMF. The mixture is shaken well and allowed to cool. Once cooled, any drop in volume is corrected by addition of further DMF.

Saturated Sodium Chloride Solution
500 ml H$_2$O and enough sodium chloride so that it doesn't all dissolve. Shake well.

10% Deactivated Silica
200 g of activated silica is introduced into a 1 L schott bottle with a PFTE sealed cap, and a glass stopper is inserted. 20 ml water is introduced to the bottle in 5 ml aliquots, with the bottle rolled between additions. The bottle is left to equilibrate for at least 2 hours.

Internal Standard Spiking Solution
10 ml of the ISTD stock solution is diluted to 500 ml with cyclohexane (conc.=10 ng/ml)

Calibration Standards
Stock A (B[a]P conc.=500 ng/ml): 0.5 ml of B[a]P in cyclohexane at 100 ng/µl diluted to 100 ml with HPLC grade cyclohexane.

Stock B (B[a]P conc.=50 ng/ml): 10 ml of stock A diluted to 100 ml with HPLC methanol.

ISTD stock (B[a]P-D$_{12}$ conc.=500 ng/ml): 0.5 ml of Deuterated B[a]P in cyclohexane at 100 ng/µl diluted to 100 ml with HPLC grade cyclohexane.

ISTD stock and stock B, in the amounts shown in the table below are made up to 50 ml with HPLC grade cyclohexane.

| Amount (ml) | | Diluted to/ | B[a]P conc. | ISTD conc. |
|---|---|---|---|---|
| Stock B | ISTD stock | ml | ng/ml | ng/ml |
| 0.5 | 1 | 50 | 0.5 | 10 |
| 1 | 1 | 50 | 1 | 10 |
| 2 | 1 | 50 | 2 | 10 |
| 3 | 1 | 50 | 3 | 10 |
| 5 | 1 | 50 | 5 | 10 |
| 10 | 1 | 50 | 10 | 10 |

Preparation of Samples
For each set of extractions a sample of reference tobacco (2R4F; www.2r4f.com) must be extracted as a control sample.

Extraction
2 g (±0.01 g) of sample is added to 1 ml of the internal standard spiking solution. Add 60 ml of Methanolic KOH and stopper. Shake and place into 60° C. waterbath for 2 hours, shaking occasionally. Remove and place them in a fume hood to cool down.

Transferring the B[a]P from Methanol to Cyclohexane
Place approximately 5 ml cyclohexane into a separating funnel. Place a funnel with a glass wool plug over the top of the separating funnel and filter the extract through the glass wool into the separating funnel. Rinse the conical flask and the funnel with approximately 100 ml cyclohexane. Stopper the separating funnel and shake vigorously. Allow the two layers to separate and decant off the Methanol layer (bottom layer). Decant the cyclohexane layer. Return the methanol layer back to the separating funnel and add a further 100 ml cyclohexane, shake vigorously. Allow the two layers to separate. Discard the methanol layer and return the first cyclohexane layer to the funnel.

Removing the KOH from the Cyclohexane
Add approximately 50 ml water to the cyclohexane that is in the separating funnel and shake well. Allow the two layers to separate, and discard the bottom aqueous layer. Repeat three times. An emulsion will form during the shaking and this can be discarded during the separations. Once all of the water washes have been completed, decant the remaining cyclohexane layer into a turbovap tube, transfer the tube to a turbovap at 40° C. and blow the extract down to approximately 50 ml.

Transferring the B[a]P from Cyclohexane to DMF/H$_2$O
Transfer the 50 ml of cyclohexane to a separating funnel and add an equal volume of the DMF/H$_2$O to the funnel, shake vigorously. Allow the two layers to separate. Decant the DMF/H$_2$O (bottom layer) into a flask. Add a further 50 ml DMF/H$_2$O to the separating funnel and shake well. Allow the two layers to separate and decant off the DMF/H$_2$O (bottom layer). Discard the top cyclohexane layer.

Transferring the B[a]P from DMF/H$_2$O to Cyclohexane

Rinse the separating funnel several times with cyclohexane to remove any residue. Transfer the combined DMF/H$_2$O extract to the separating funnel. Add an equal volume of cyclohexane and 50 ml saturated sodium chloride solution. Shake well. Allow the two layers to separate; a layer of salt will form between the two layers, discard the DMF/H$_2$O (bottom) layer. In a glass funnel loosely place a plug of glass wool and pour about 2-3 cm of granular anhydrous sodium sulphate into the funnel. Place the funnel in a turbovap tube and filter the cyclohexane layer through the sodium sulphate into the turbovap tube. In a turbovap at 40° C. blow the sample down to approximately 10 ml.

Silica Column Clean-Up

Weigh out 5 g (±0.05 g) of 10% deactivated silica and add approximately 10 ml cyclohexane: a slurry will form. Transfer this into one a glass column; keep rinsing the beaker into the column until the silica has been washed out. Add 2 cm in depth of granular sodium sulphate. Place a turbovap tube below the column. Pour the 10 ml of sample into the column and allow the cyclohexane to filter through the column into the turbovap tube. Rinse the original turbovap tube with approximately 50 ml of cyclohexane and carefully transfer this to the column, making sure not to disturb the silica. Slowly add a further 100 ml cyclohexane to elute the B[a]P from the column.

GCMS Parameters

| Injector: | |
|---|---|
| Sample washes: | 2 |
| Sample pumps: | 2 |
| Injection volume: | 2 μl |
| Syringe size: | 10 μl |
| Post inj Solvent A washes: | 5 |
| Post inj Solvent B washes: | 5 |
| Viscosity delay: | 0 seconds |
| Plunger speed: | Fast |
| Pre injection dwell: | 0.00 minutes |
| Post injection dwell: | 0.00 minutes |
| Column: | |
| Column: | HP5-MSI 30 m × 0.25 mm × 0.25 μm |
| Mode: | Constant flow |
| Initial flow: | 1 ml/min |
| Nominal initial pressure: | 8.52 psi |
| Average velocity: | 37 cm/sec |
| Inlet: | |
| Mode: | Pulsed Splitless |
| Temperature: | 250° C. |
| Pressure: | 8.51 psi |
| Pulse pressure: | 25.0 psi |
| Pulse time: | 2.00 min |
| Purge flow: | 50.0 ml/min |
| Purge time: | 2.00 min |
| Total flow: | 54.2 ml/min |
| Gas saver: | On |
| Saver flow: | 20.0 ml/min |
| Saver time: | 2.00 min |
| Gas type: | Helium |
| Oven: | |
| Initial temp: | 60° C. |
| Initial time: | 2.00 |

-continued

| Ramps: | | | |
|---|---|---|---|
| # | Rate | Final temp | Final time |
| 1 | 30.0 | 250° C. | 15.0 min |
| 2 | 40.0 | 310° C. | 10.0 min |
| 2 | 0.0 (off) | | |

| Post temp: | 0° C. |
|---|---|
| Post time: | 0.00 min |
| Run time: | 34.67 min |
| MSD Transfer Line: | |
| Solvent Delay/min.: | 14.0 min |

| | Ion | Dwell Time/ms |
|---|---|---|
| SIM Ions: | 252 | 150 |
| | 250 | 150 |
| | 264 | 150 |
| | 264 | 150 |
| Resolution: | Low | |
| MS Quad: | 150° C. | |
| MS Source: | 230° C. | |
| MS Off/min.: | 23.0 min | |

MS Info:
MSD Transfer line:
Initial temp: 280° C.
Initial time: 0.00 min

Analysis

A calibration curve can be created by plotting the response ratio of the deuterated B[a]P to B[a]P response areas, against the concentration of B[a]P in the standards and the slope and intercept are calculated.

Instrument calculation $$\frac{(\text{Response Ratio} - \text{Intercept})}{\text{Slope}} \times \text{Internal Standard } Conc. \text{ ng/ml} = B[a]P \text{ ng/ml}$$

Conversion of $ng$/ml to $ng$/g wet weight basis $$\frac{\text{Final sample volume (ml)} \times B[a]P \text{ (ng/ml)}}{\text{Weight of wet sample (g)}} = B[a]P \text{ ng/g wet weight basis}$$

Conversion of $ng$/g of wet sample to $ng$/g of dry sample $$B[a]P \text{ ng/g wet sample} \times \frac{(100)}{(100 - \text{moisture \%})} = B[a]P \text{ ng/g dry weight basis}$$

EXAMPLE 3

Determination of Levels of TSNAs

Quantitative determination of TSNAs in tobacco can be carried out using liquid chromatography-tandem mass spectrometry (LC-MS/MS).

In summary, approximately 0.5 g of milled tobacco is weighed into a centrifuge tube, and 100 μl of a mix containing four different internal standards is added.

These internal standards are the deuterated equivalents (NAB-d$_4$, NAT-d$_4$, NNK-d$_4$ and NNN-d$_4$) of the 4 TSNAs that are being quantified (NAB, NAT, NNK and NNN). The sample is subsequently extracted by adding 20 ml of methanol. The suspension is then sonicated for 30 min and centrifuged for 5 min at 5000 rpm. From the supernatant, about 1.4 ml is transferred to an autosampler vial to be analyzed by LC-MS/MS. The system is calibrated with a set of internally standardized TSNA standards. The spiking levels of the internal standards in the TSNA calibration standards are comparable to the spiking levels of the internal standards in the samples.

Internal Standard Stock Solutions

| label | [NAB-d4] (µg/ml) | [NAT-d4] (µg/ml) | [NNK-d4] (µg/ml) | [NNN-d4] (µg/ml) | weighed amount (mg) | methanol final volume (ml) |
|---|---|---|---|---|---|---|
| IS-NAB-STOCK_200 | 200 | 0 | 0 | 0 | 10 | 50 |
| IS-NAT-STOCK_200 | 0 | 200 | 0 | 0 | 10 | 50 |
| IS-NNK-STOCK_200 | 0 | 0 | 200 | 0 | 10 | 50 |
| IS-NNN-STOCK_200 | 0 | 0 | 0 | 200 | 10 | 50 |

The internal standard stock solutions are used to prepare intermediate internal standard stock solutions:

Intermediate Internal Standard Stock Solutions

| label | [NAB-d4] (µg/ml) | [NAT-d4] (µg/ml) | [NNK-d4] (µg/ml) | [NNN-d4] (µg/ml) | Volume taken (ml) | From Solution | methanol added (ml) |
|---|---|---|---|---|---|---|---|
| IS-NAB-STOCK_10 | 10 | 0 | 0 | 0 | 1 | IS-NAB-STOCK_200 | 19 |
| IS-NAT-STOCK_10 | 0 | 10 | 0 | 0 | 1 | IS-NAT-STOCK_200 | 19 |
| IS-NNK-STOCK_10 | 0 | 0 | 10 | 0 | 1 | IS-NNK-STOCK_200 | 19 |
| IS-NNN-STOCK_10 | 0 | 0 | 0 | 10 | 1 | IS-NNN-STOCK_200 | 19 |

These intermediate internal standard stock solutions are used to prepare the working internal standard stock solutions:

Working Internal Standard Stock Solutions

| Label | [NAB-d4] (µg/ml) | [NAT-d4] (µg/ml) | [NNK-d4] (µg/ml) | [NNN-d4] (µg/ml) | volume taken (ml) | taken from solution (label) | methanol added (ml) | final volume (ml) |
|---|---|---|---|---|---|---|---|---|
|  | 10 | 0 | 0 | 0 | 2 | IS-NAB-STOCK_10 | 0 | 2 |
|  | 3.3 | 6.7 | 0 | 0 | 4 | IS-NAT-STOCK_10 | 0 | 6 |
|  | 2 | 4 | 4 | 0 | 4 | IS-NNK-STOCK_10 | 0 | 10 |
| IS_2 | 1 | 2 | 2 | 2 | 4 | IS-NNN-STOCK_10 | 6 | 20 |
| IS_0.1 | 0.05 | 0.1 | 0.1 | 0.1 | 1 | IS_2 | 19 | 20 |

The working standards are prepared by dilution of the standards stock solutions:

Preparation of the Working Standards Solutions

| Label | [NAB] (ng/ml) | [NAT] (ng/ml) | [NNK] (ng/ml) | [NNN] (ng/ml) | volume taken (µl) | from solution (label) | methanol added (µl) | final volume (µl) |
|---|---|---|---|---|---|---|---|---|
| STD_100 | 50 | 100 | 100 | 100 | 200 | STD-STOCK_1 | 1800 | 2000 |
| STD_50 | 25 | 50 | 50 | 50 | 100 | STD-STOCK_1 | 1900 | 2000 |
| STD_10 | 5 | 10 | 10 | 10 | 200 | STD_100 | 1800 | 2000 |
| STD_5 | 2.5 | 5 | 5 | 5 | 200 | STD_50 | 1800 | 2000 |
| STD_1 | 0.5 | 1 | 1 | 1 | 200 | STD_10 | 1800 | 2000 |
| STD_0.1 | 0.05 | 0.1 | 0.1 | 0.1 | 200 | STD_1 | 1800 | 2000 |
| STD_0.05 | 0.025 | 0.05 | 0.05 | 0.05 | 100 | STD_1 | 1900 | 2000 |
| STD_0.01 | 0.005 | 0.01 | 0.01 | 0.01 | 200 | STD_0.1 | 1800 | 2000 |

The internally standardized standards and QC are prepared by adding internal standard solution (IS_0.1) to the working standards solutions and a QC stock standard:

Preparation of the Internally Standardized Standards and QC Solutions

| Label | [NAB] (ng/ml) | [NAT] (ng/ml) | [NNK] (ng/ml) | [NNN] (ng/ml) | volume taken (µl) | From solution (label) | IS_0.1 added (µl) | final volume (µl) |
|---|---|---|---|---|---|---|---|---|
| STD-IS_100 | 45 | 90 | 90 | 90 | 900 | STD_100 | 100 | 1000 |
| STD-IS_50 | 22.5 | 45 | 45 | 45 | 900 | STD_50 | 100 | 1000 |
| STD-IS_10 | 4.5 | 9 | 9 | 9 | 900 | STD_10 | 100 | 1000 |
| STD-IS_5 | 2.25 | 4.5 | 4.5 | 4.5 | 900 | STD_5 | 100 | 1000 |
| STD-IS_1 | 0.45 | 0.9 | 0.9 | 0.9 | 900 | STD_1 | 100 | 1000 |
| STD-IS_0.1 | 0.045 | 0.09 | 0.09 | 0.09 | 900 | STD_0.1 | 100 | 1000 |
| STD-IS_0.05 | 0.0225 | 0.045 | 0.045 | 0.045 | 900 | STD_0.05 | 100 | 1000 |
| STD-IS_0.01 | 0.0045 | 0.009 | 0.009 | 0.009 | 900 | STD_0.01 | 100 | 1000 |
| QC | 4.5 | 18 | 18 | 18 | 900 | STD-QC | 100 | 1000 |

The concentrations of $NAB\text{-}d_4$, $NAT\text{-}d_4$, $NNK\text{-}d_4$ and $NNN\text{-}d_4$ are therefore respectively 5, 10, 10, 10 ng/ml in all internally standardized standards and QC solutions.

The invention claimed is:

1. A process for extracting and isolating constituents from cellulosic material, the process comprising:
    contacting cellulosic material with a supercritical fluid under conditions to provide an extract;
    removing insoluble material from the extract; and
    fractionating the extract by distillation under depressed pressure compared to atmospheric pressure to provide one or more isolated constituents, said fractionating including a first distillation carried out under a pressure of 90-130 mbar.

2. The process as claimed in claim 1, wherein the supercritical fluid is carbon dioxide.

3. The process as claimed in claim 2, wherein a temperature during said contacting is around 40° C., and a pressure during said contacting is around 30 MPa.

4. The process as claimed in claim 1, further comprising a water-removal performed after said removing.

5. The process as claimed in claim 1, wherein said first distillation is carried out at a temperature from 80° C. to 150° C.

6. The process as claimed in claim 1, wherein said fractionating comprises one or more further distillations.

7. The process as claimed in claim 6, wherein a first further distillation is carried out under a pressure of between 1 mbar and 5 mbar.

8. The process as claimed in claim 6, wherein a second further distillation is carried out under a pressure of between 1 mbar and 5 mbar.

9. The process according to claim 1, wherein the cellulosic material is derived from one of mullein, cloves, mint, tea, *Eucalyptus*, camomile and tobacco.

10. The process according to claim 9, wherein the cellulosic material is tobacco lamina.

11. The process according to claim 1, wherein the one or more isolated constituents are substantially pure, or have a reduced level of one or more of nicotine, one or more nitrosamines, or benzo[a]pyrene in comparison to the cellulosic material from which the constituents were isolated, or from the cellulosic material from which the constituents were isolated when concentrated and/or processed to a comparable extent.

12. The process as claimed in claim 1, wherein the one or more isolated constituents are substantially free of at least one of nicotine, one or more nitrosamines, and benzo[a]pyrene.

13. The process as claimed in claim 12, wherein the one or more isolated constituents have at least one of levels of nitrosamines below 0.1 µg/ml, levels of nicotine below 25 mg/ml, and levels of benzo[a]pyrene below 2 ng/g.

14. The process as claimed in claim 1, wherein the one or more isolated constituents are one or more of coumarin, pulegone, piperonal, trans-anethole, safrole, methyl eugenol and myristicin.

15. The process as claimed in claim 1, wherein the first distillation is carried out at a temperature of between 90-120° C.

16. The process as claimed in claim 1, wherein the first distillation is carried out at a temperature between 100° C. and 110° C.

17. The process as claimed in claim 1, wherein said first distillation is carried out under a pressure from 100 mbar to 110 mbar.

18. The process as claimed in claim 1, wherein said first distillation is carried out under a pressure of 100 mbar.

19. The process as claimed in claim 6, wherein a first further distillation is carried out under a pressure of between 1 mbar and 3 mbar.

20. The process as claimed in claim 6, wherein a first further distillation is carried out under a pressure of 2 mbar.

21. The process as claimed in claim 6, wherein a first further distillation is carried out at an initial temperature of between 110° C. and 180° C.

22. The process as claimed in claim 6, wherein a first further distillation is carried out at an initial temperature of between 120° C. and 160° C.

23. The process as claimed in claim 6, wherein a first further distillation is carried out at an initial temperature of between 135° C. and 155° C.

24. The process as claimed in claim 21, wherein the initial temperature reduces to between 110° C. and 150° C.

25. The process as claimed in claim 21, wherein the initial temperature reduces to 140° C.

26. The process as claimed in claim 6, wherein a second further distillation is carried out under a pressure of between 1 mbar and 3 mbar.

27. The process as claimed in claim 6, wherein a second further distillation is carried out under a pressure of 2 mbar.

28. The process as claimed in claim 6, wherein a second further distillation is carried out under an initial temperature of between 110° C. and 180° C.

29. The process as claimed in claim 6, wherein a second further distillation is carried out under an initial temperature of between 120° C. and 160° C.

30. The process as claimed in claim 6, wherein a second further distillation is carried out under an initial temperature of between 135° C. and 155° C.

31. The process as claimed in claim 28, wherein the initial temperature reduces to between 110° C. and 140° C.

32. The process as claimed in claim 28 wherein the initial temperature reduces to 130° C.

33. A method, comprising: contacting cellulosic material with a supercritical fluid to provide an extract; removing insoluble material from the extract; and fractionating the extract by distillation under depressed pressure compared to atmospheric pressure to provide one or more isolated constituents of the cellulosic material, said fractionating including a first distillation carried out under a pressure of about 100 mbar.

* * * * *